(12) United States Patent
Neugart

(10) Patent No.: US 6,413,006 B1
(45) Date of Patent: Jul. 2, 2002

(54) CONNECTION OF A SLOTTED HOLLOW SHAFT, HOLLOW AXLE OR SLEEVE WITH AN ENGAGING COUNTERPART

(75) Inventor: Georg Neugart, Kippenheim (DE)

(73) Assignee: Neugart GmbH & Co., Kippenheim (DE)

( * ) Notice: Subject to any disclaimer, the term of this patent is extended or adjusted under 35 U.S.C. 154(b) by 0 days.

(21) Appl. No.: 09/506,645

(22) Filed: Feb. 18, 2000

(30) Foreign Application Priority Data

Feb. 19, 1999 (DE) .......................... 199 07 181

(51) Int. Cl.⁷ .............. F16B 2/02; F16H 49/00
(52) U.S. Cl. .......... 403/344; 403/373; 403/290; 74/DIG. 10
(58) Field of Search ............... 403/344, 373, 403/290, 379.3; 74/DIG. 10, 421 R, 440

(56) References Cited

U.S. PATENT DOCUMENTS

| 2,312,760 A | * | 3/1943 | Heidegger | 403/379.3 |
| 3,127,784 A | * | 4/1964 | O'neill | 403/388 X |
| 3,354,672 A | * | 11/1967 | Klaeui | 403/354 X |
| 4,110,054 A | * | 8/1978 | Moeller, Jr. | 403/373 |
| 4,632,596 A | * | 12/1986 | Boehne | 403/345 |
| 4,934,990 A | * | 6/1990 | Backers | 474/152 |
| 5,006,007 A | * | 4/1991 | Fischer et al. | 403/290 |
| 5,052,842 A | * | 10/1991 | Janatka | 403/14 |
| 5,851,084 A | * | 12/1998 | Nishikawa | 403/344 |

FOREIGN PATENT DOCUMENTS

| DE | PS 429 819 | | 6/1926 | |
| GB | 1028825 A | * | 5/1996 | 403/290 |
| JP | 4-95603 A | * | 3/1992 | 403/344 |

* cited by examiner

Primary Examiner—Lynne H. Browne
Assistant Examiner—Ernesto Garcia
(74) Attorney, Agent, or Firm—Akin, Gump, Strauss, Hauer & Feld, L.L.P.

(57) ABSTRACT

A connection belonging to a rotary drive or rotary driven connection of a slotted hollow shaft (1), a hollow axle or sleeve with a counterpart, namely a motor shaft. (3), fitting into and engaging in a slotted and hollow region (2), or region (2) having a bore hole, has at least one clamping or tightening element (5). The tightening element (5) is adjustable with respect to its inner diameter enclosing the slotted region (2), generally with a tightening screw (8), for clamping the slotted region (2) with the engaging counterpart. The slot(s) (9) of the slotted region (2) are here closed at both ends so that, in the region of the end face (10) of the hollow shaft (1) or the like, a closed and consequently stabilizing annular area runs, in particular uninterrupted.

7 Claims, 5 Drawing Sheets

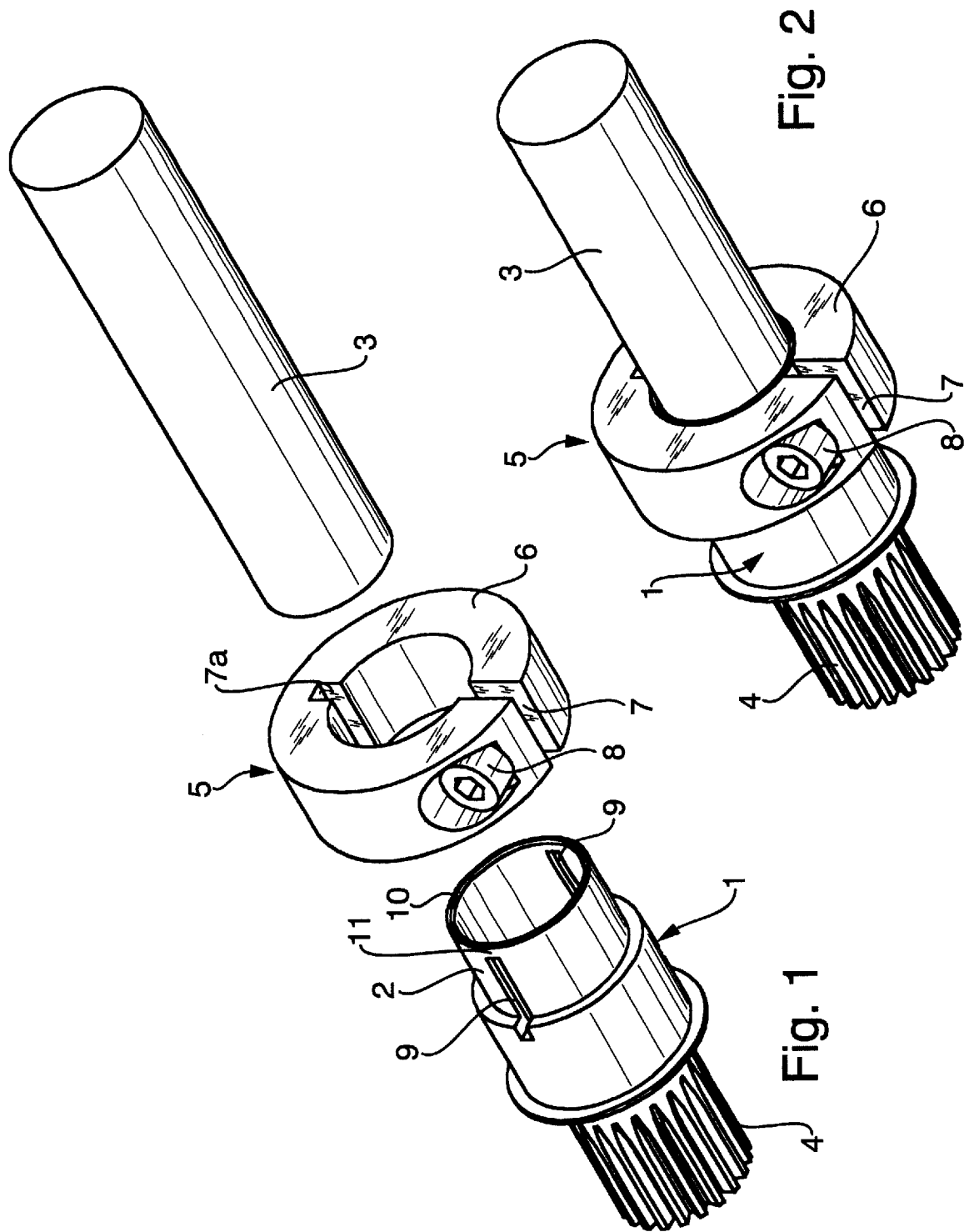

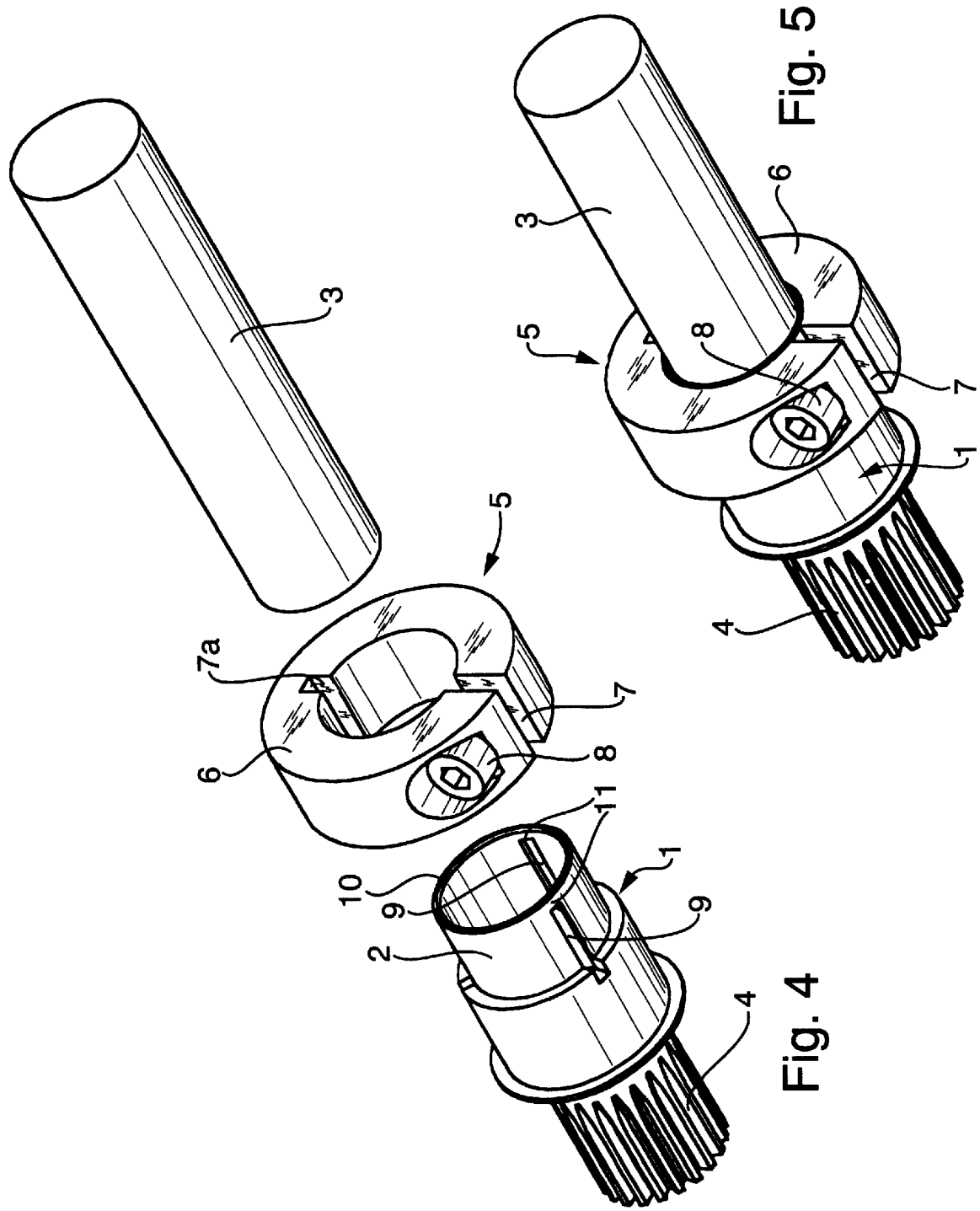

CONNECTION OF A SLOTTED HOLLOW SHAFT, HOLLOW AXLE OR SLEEVE WITH AN ENGAGING COUNTERPART

BACKGROUND OF THE INVENTION

The invention relates to a connection of a hollow shaft with a shaft, wherein the hollow shaft is provided with a pinion and has a slotted region facing away from the pinion, into which the shaft fits and engages in operating position. At least one clamping or tightening element, which is adjustable with respect to its diameter, encloses the slotted region and is provided for clamping the slotted region with the engaging shaft. The slotted region has at least one slot extending in an axial direction.

Such a connection is known and serves the purpose of coupling the output shaft of a motor, i.e., the motor shaft, rotation-tight with a counterpart or gear to be rotated. The slotted hollow shaft thereby allows an adaptation to various diameter tolerances of the engaging shaft to be connected. The slot width can be diminished by the tightening element which reduces the periphery, and the periphery of the slotted hollow shaft can be adapted so that this is pressed on the counterpart in friction-locking engagement. The more such slots are present, the better this arrangement succeeds, and with the usual solutions two slots lying opposite one another across a diameter or three slots evenly distributed on the periphery, respectively openly discharging on the insertion end of the hollow shaft, are therefore provided. There, one proceeds from the assumption that these free or open-ended slots result in a good pliability of the slotted region of the hollow shaft.

At the same time, however, it arises through these open-ended slots, when they are connected with the insertable counterpart, that the tightening element must be precisely adapted with its slot to one of the slots of the hollow shaft, in order to avoid relative movements between the interior of the tightening element and the exterior of the slotted hollow shaft upon tightening, and thereby avoid possible distortions, which could hinder a sufficiently tight pressing together. Furthermore, the slots are conically deformed by tightening. That is, the originally parallel-running slots are brought into an inclined position relative to one another, whereby, viewed in an axial direction, changing clamping forces and diameters can arise, which lead to motion inexactitudes of the rotating parts. There, it is even possible that the slotted element and the counterpart insertable therein can be pressed into not exactly aligning positions, so that upon rotation, owing to the alignment defect, an non-round course occurs, which additionally stresses bearings, gear teeth, etc., generates corresponding noise, and increases wear.

SUMMARY OF THE INVENTION

There thus exists the objective of creating a rotation-tight connection of the type mentioned at the outset, in which, without substantial additional expense, a precise deformation of the slotted region is made possible with uniform pressing on the counterpart to be connected. Even the coaxiality and alignment are thereby improved.

For accomplishing this objective, it is provided in connection with a slotted hollow shaft, hollow axle or sleeve that at least one slot is closed on both of its ends, and consequently also on the open end of the hollow shaft for insertion of the shaft, and that the beginning of the slot(s) facing the insertion end of the hollow shaft is spaced from this insertion end or the front face of the hollow shaft.

Instead of one or more continuous and freely opening slots, which subdivide the insertion end of the hollow shaft, hollow axle or sleeve into individual clamping tabs, an uninterrupted front face is thus created on the end of the clamping region, and in the event that all axial slots on this end are closed, an uninterrupted annular ring area is created, by which the hollow shaft or the like is stabilized on its open front face and at the same time achieves improved centering and alignment characteristics. Furthermore, there arises in the slotted region, upon pressing together and radial deformation, a more even deformation and a more uniform approximation to the respective slot boundaries, and consequently a more even diameter diminution. Still further, the inserted counterpart to be connected can be held and clamped over a larger axial area, so that even angle or alignment errors do not or hardly arise, and possible angle errors, even unintentionally brought about during insertion, are again, at least to the extent possible, compensated for by this clamping.

Moreover, the position of the slot(s) relative to the slots of the clamping or tightening element or of the tightening ring is no longer important, whereby the assembly is facilitated, primarily at difficultly viewable places. Finally, it is simpler in terms of production engineering to adhere to the processing tolerances of the hollow shaft bore, since no resilient parts must be turned or polished. The bore hole can be manufactured suitably exactly.

It is especially beneficial herein, if several slots are distributed on the periphery, and at least one of them, especially all of them, are closed on the insertion end into the hollow shaft. The clamping forces can be so much better distributed on the periphery of the shaft to be connected, the more of such slots are provided. Here, the one or another slot can indeed be open on the front end, whereby in the area of this slot, the previously sketched advantages of a closed slot would be forfeited. Nonetheless, these advantages would then result in the area of the further closed slot(s). By way of example, a slot open on the front end could lie diametrically opposite to a closed slot of the hollow shaft, so that nonetheless, even in the area of the closed slot, a more precise connection is achieved, while in the area of the open slot, the insertion of the counterpart could be facilitated, because this slot permits a short-term expansion, especially when the outside diameter of the shaft deviates only a little from the inner diameter of the hollow shaft. Likewise, in embodiments with more than two slots, one of the slots could remain open on the front end for facilitating the insertion of the counterpart with relatively small dimension differences, while the remaining slots are closed.

It is beneficial if at least two or three, preferably four or especially five slots closed on both their ends are provided distributed evenly on the periphery of the hollow shaft. This yields a good distribution of clamping forces in an axial and peripheral direction and a defined deformation of the bore in the slotted region. Since, on the insertion end, a practically circular closed annular area remains in existence, which has a similar deformation resistance as that of the hollow shaft on the opposite end outside the slotted region, practically the entire slotted region is clamped, and essentially less strong edge supports result than with open slots on the front end. Above all, the coaxiality and consequently the rotational accuracy of the connection are increased. The insertability of the counterpart can moreover be facilitated by corresponding roundings or bevels. Experiments have shown that, for a precise connection or coupling for the transmission of high torques, five closed slots distributed evenly on the periphery represent a good compromise between manufacturing expense on the one hand and connection precision on the other hand. Above all, there results here a very high rotational accuracy.

The number of slots closed on their ends can be an uneven number. An unslotted region thereby lies respectively opposite a slot on a diameter.

The slots can be constructed as elongated holes, in particular can be milled out, and their boundaries can run parallel to one another with a still open connection in an undeformed position. This permits an economical manufacture with a simple milling tool.

The axially running slot(s) closed on their ends can be arranged deflected from the coaxial or axially parallel position relative to the longitudinal central axis, even inclined at an acute angle, and in particular parallel to one another. With equal axial extension of the slots, the absolute slot length can thereby be enlarged, which can lead to a simpler radial deformation of the slotted region.

By axial direction of travel of the slot, not only a coaxial, axially parallel, or an arrangement following the jacket lines is to be understood, but also one in which the slot(s) run(s) in an axial direction and at the same time somewhat inclined to the longitudinal central axis or to the jacket lines.

The spacing of the slot(s) from the insertion end or the front face of the hollow shaft can approximately correspond to the radial wall thickness or the thickness of the hollow shaft, or be larger or smaller. A sufficiently tight circular ring area adjacent to the front face is created, which upon clamping the slotted region has the desired resistance moment.

BRIEF DESCRIPTION OF SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings in partially schematic representation:

FIG. 1 is a disassembled, so-called exploded representation of a connection of the invention between a slotted hollow shaft and a further shaft fitting into this and having a tightening element, wherein two slots closed at both ends are provided lying opposite each other across a diameter, in perspective view;

FIG. 2 is connection in accordance with FIG. 1 in the assembled state, likewise in perspective view;

FIG. 4 is a representation corresponding to FIG. 1 of a modified embodiment, in which three slots closed on their ends are evenly distributed on the periphery;

FIG. 5 is a representation corresponding to FIG. 2 of the assembled embodiment of FIG. 4;

DETAILED DESCRIPTION OF THE INVENTION

Figure 3:
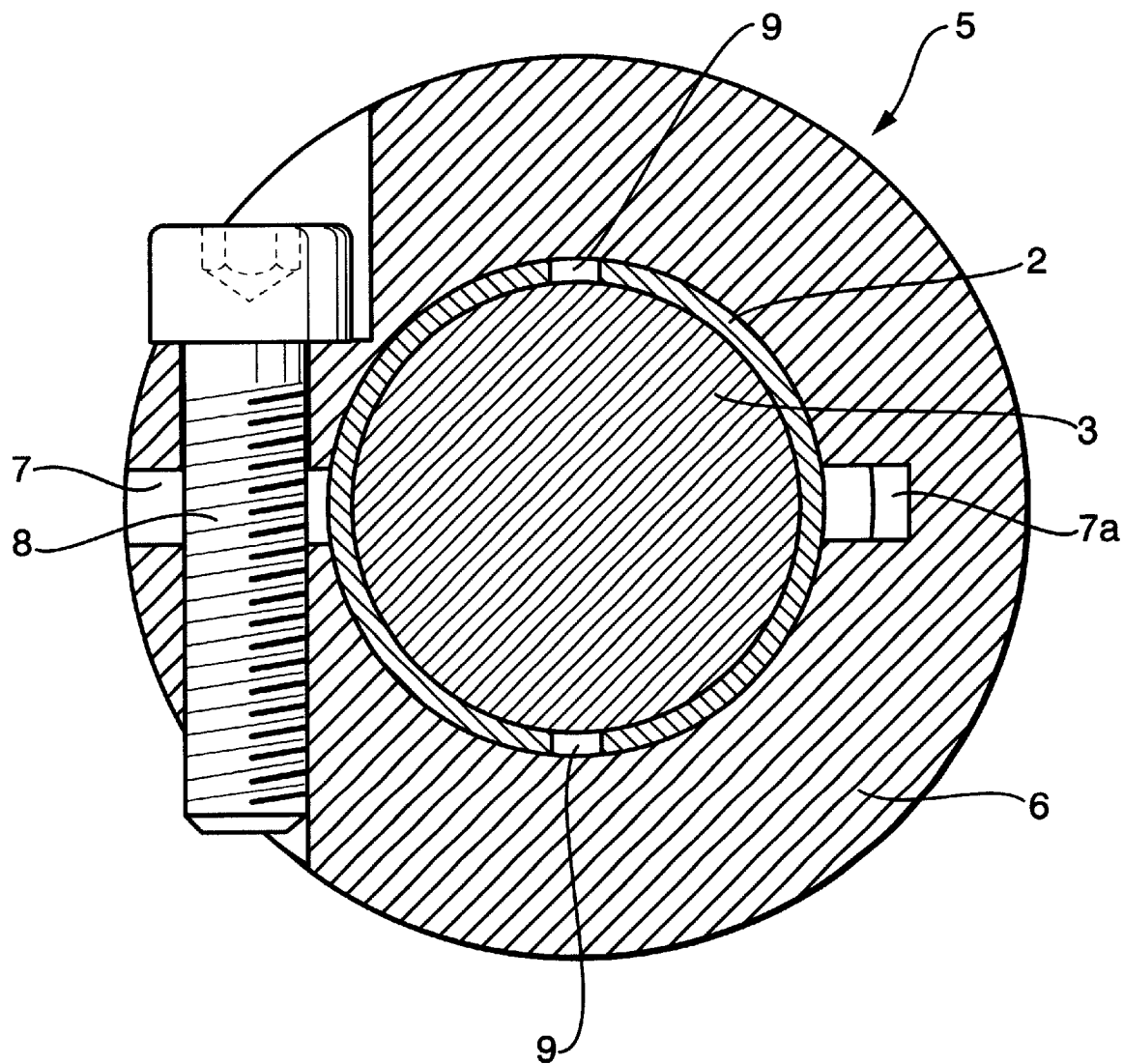
FIG. 3 is a cross section of the connection in the region of the tightening element, wherein the slots of the tightening element and the slots of the slotted region are rotated relative to each other.

In FIGS. 2 and 5 are shown the connections of a slotted hollow shaft 1 with a counterpart, in this case a shaft 3, fitting and engaging in its slotted region 2. The same connections, represented prior to assembly, are shown respectively in FIGS. 1 and 4. Moreover, the hollow shaft 1 in these embodiments is provided with a pinion 4. That is, the shaft 3 can be a motor shaft, which is coupled force-locked with the motor pinion 4 through this connection. The force-locking connection here takes place with a clamping or tightening element 5, adjustable with respect to its diameter, enclosing the slotted region 2 in accordance with FIGS. 2, 3, 5, 6, 7 and 8. The clamping or tightening element 5 has a slotted ring 6 and a tightening screw 8 penetrating an open slot 7. By tightening the tightening screw 8, the interior diameter of the tightening ring 6 can be diminished in a known manner, which leads to a corresponding radial deformation of the slotted region 2, owing to the flexibility of the slots provided there.

In the embodiment according to FIGS. 1 to 3, two slots 9 lying approximately opposite each other on a diameter are provided here, while in the embodiments according to FIGS. 4 to 8, three such slots are evenly distributed on the periphery of the hollow shaft 1. In both embodiments the slots 9 are closed on both ends, and consequently on the open end of the hollow shaft 1 for insertion of the counterpart, thus the shaft 3, which can also be a hollow axle or sleeve. Consequently, there results axially adjacent to the slotted region 2, directly on the front face 10 of the hollow shaft 1, a further closed annular ring region 11, which stabilizes the slotted region 2 toward the front face 10 as well, so that the transmission of the tightening forces by the tightening element 5 can be evenly distributed over the length of the slots 9 in the slotted region 2. The connection between the hollow shaft 1 and the counterpart or shaft 3 is correspondingly precise.

The beginning of the slots 9 facing the insertion end or the front face 10 is here spaced from the front face 10 of the hollow shaft 1, which at least approximately corresponds to the radial wall thickness or thickness of this hollow shaft 1, or is possibly larger, so that this ring region 11 has a suitably great stability.

In FIG. 3 it is recognizable that, with an embodiment having two slots 9 lying radially opposite each other, these need not be in alignment with the slot 7 and the in turn opposite-lying slot 7a of the tightening element 5, in order nonetheless to obtain a good clamping. It would be possible, however, to bring the slots 9 and the slots 7 and 7a into alignment with one another.

Figure 6:
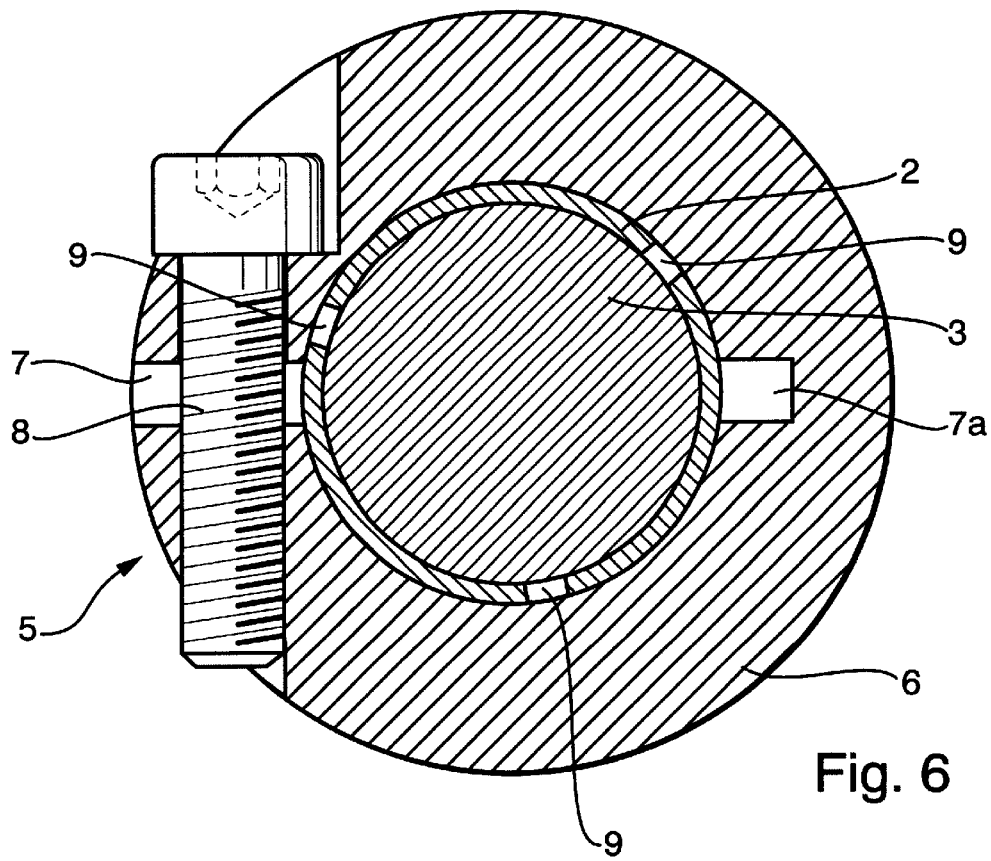
FIG. 6 is a cross section of the connection area and the tightening element, wherein the two slots are rotated in the peripheral direction relative to the three slots of the slotted region.
Figure 7:
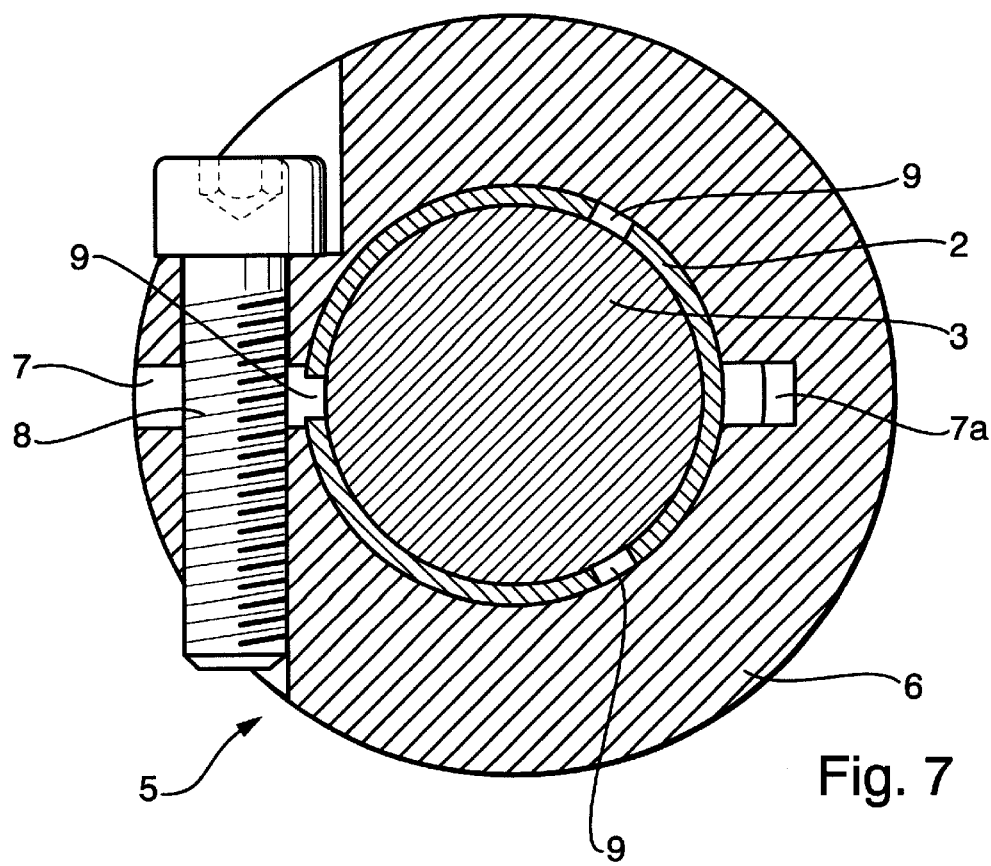
FIG. 7 is a representation corresponding to FIG. 6, in which one of the slots of the slotted hollow shaft is in alignment with the slot of the tightening element, which is adjustable by a cross screw.

In like manner it is represented in FIG. 6 that, with an embodiment having three slots 9 on the hollow shaft 1, none of them needs to be in alignment with one of the slots 7 or 7a of the tightening element 5, while FIG. 7 shows, however, that one of the slots 9 can be assembled in alignment with slot 7, in order to bring about a direct transmission of the narrowing of slot 7 to this slot 9.

Figure 8:
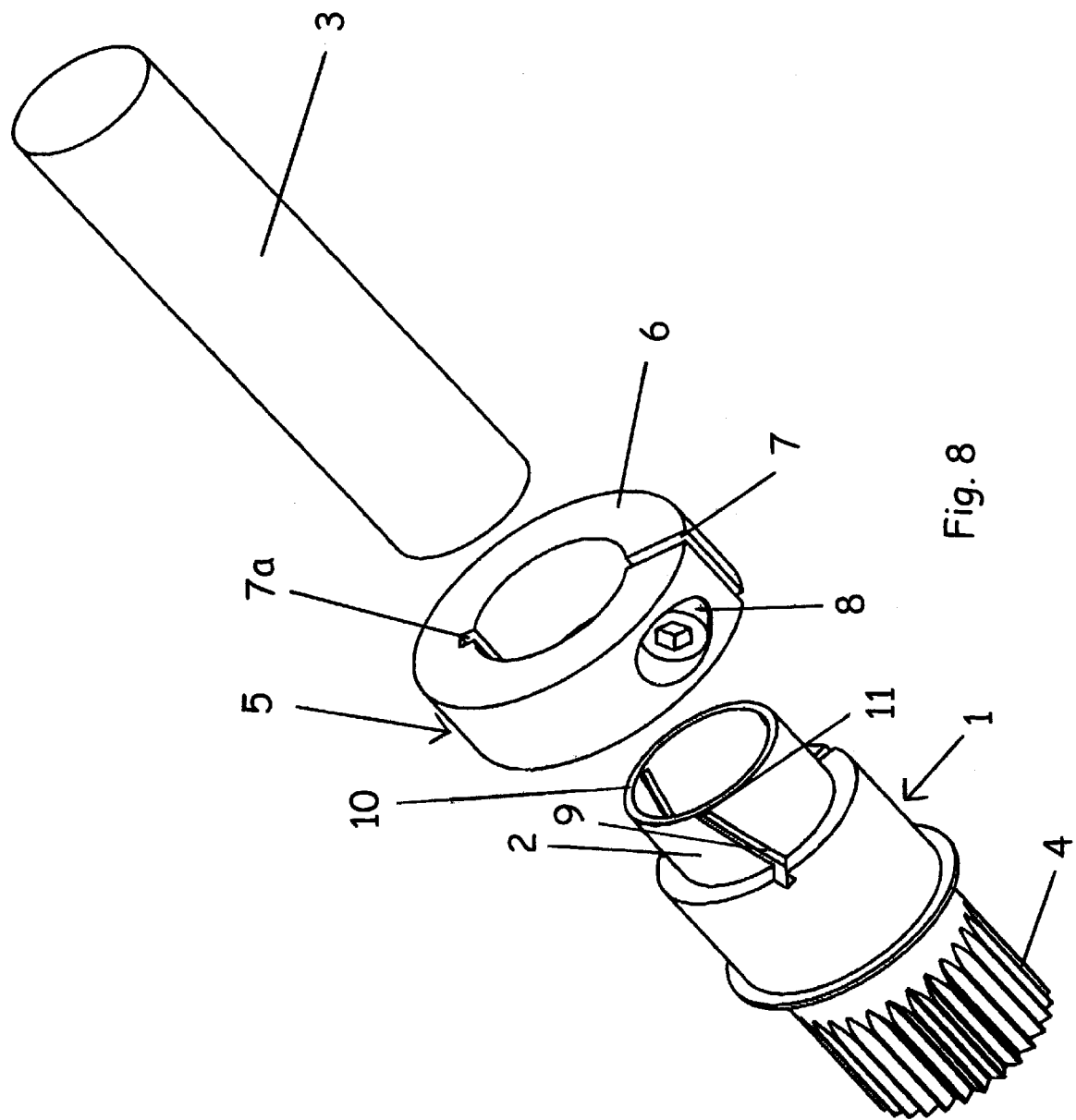
FIG. 8 is a representation corresponding to FIG. 1 of a modified embodiment, in which the slots closed on their ends are inclined relative to a longitudinal central axis of the hollow shaft at an acute angle and parallel to one another.

Similarly in FIG. 8 it is represented that the slots 9 on the hollow shaft 1 may also be inclined relative to a longitudinal central axis of the hollow shaft 1 at an acute angle.

Since with all embodiments the ends of the slots 9, uninterrupted edge or ring areas 11, are provided on both sides on the hollow shaft 1, there results a more even deformation of the slotted region 2, than if the slots 9 would openly discharge on the front face 10. The hollow shaft 1 and its internal longitudinal cavity or bore hole is correspondingly precise. In addition, the exterior can also be well processed after slotting, for example to remove burrs or the like, without thereby flexing or spreading apart the regions situated between the slots 9.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

I claim:

1. A connection of a hollow shaft (1) with a shaft (3) which fits and engages therein in an operating position, comprising the hollow shaft (1) having a pinion (4) on one end and a slotted region (2) on an open insertion end (10) facing away from the pinion (4) and into which the shaft (3) fits and engages, and at least one clamping or tightening element (5) adjustable with respect to its diameter and enclosing the slotted region (2) for clamping the slotted region (2) with the shaft (3), the slotted region (2) having at least one slot (9) extending in an axial direction of the hollow shaft (1), such slot having a first end facing the pinion (4) and a second end facing the open insertion end (10), wherein the at least one slot (9) is closed on both of its first and second ends, and wherein the second end of the at least one slot (9) is spaced from the insertion end (10) of the hollow shaft (1).

2. The connection according to claim 1, wherein the slotted region (2) has a plurality of the at least one slot (9) distributed on the periphery of the insertion end (10).

3. The connection according to claim 2, wherein the slotted region (2) has two to five of the at least one slot (9) closed on both of their first and second ends and evenly distributed on the periphery of the insertion end (10) of the hollow shaft (1).

4. The connection according to claim 2, wherein the hollow shaft (1) has an uneven number of the at least one slot (9) closed on both of their first and second ends.

5. The connection according to claim 2, wherein the plurality of slots (9) are constructed as elongated bores, and wherein their boundaries run parallel to one another in a still open connection in an undeformed position.

6. The connection according to claim 2, wherein the plurality of slots (9) are closed on both of their first and second ends and are arranged inclined relative to a longitudinal central axis of the hollow shaft (1) at an acute angle parallel to one another.

7. The connection according to claim 1, wherein the at least one slot (9) is spaced from the insertion end (10) of the hollow shaft (1) at a distance approximately corresponding to a radial wall thickness or a thickness of the hollow shaft (1).

* * * * *